Figure 4:
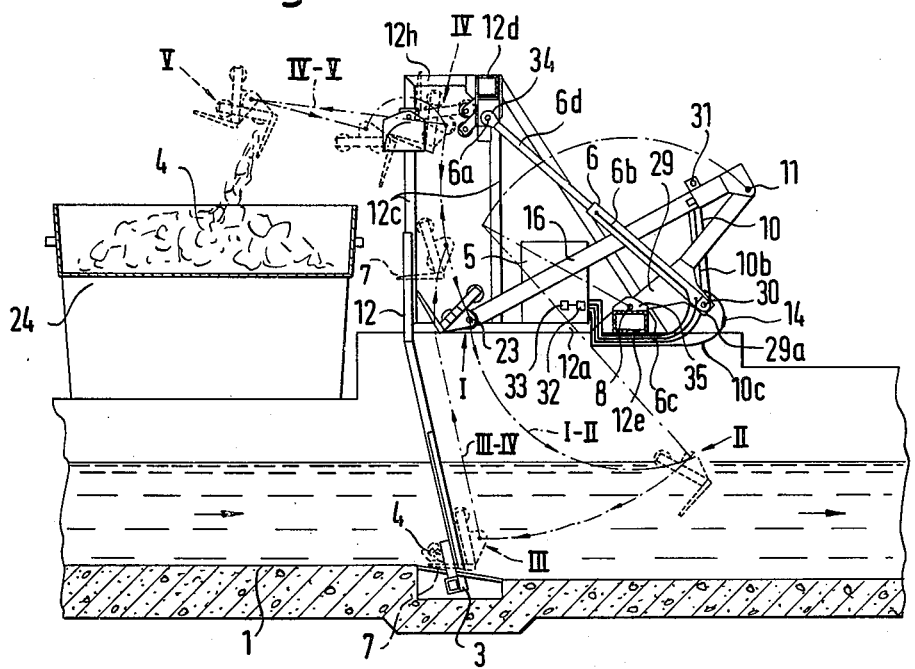

United States Patent [19]

Angele et al.

[11] 3,909,411
[45] Sept. 30, 1975

[54] GRATE RAKE FOR CLEANING A GRATE ARRANGED IN A WATER CONDUIT

[75] Inventors: Eduard Angele, Langenhagen; August Schreiber; Jurgen Seipp, both of Vinnhorst, all of Germany

[73] Assignee: August Schreiber, Hannover-Vinnhorst, Germany

[22] Filed: Apr. 16, 1974

[21] Appl. No.: 461,380

[30] Foreign Application Priority Data
Apr. 18, 1973 Germany............................ 2319699
Mar. 11, 1974 Germany............................ 2411626

[52] U.S. Cl................................ 210/159; 210/162
[51] Int. Cl.²................... B01D 29/38; B01D 35/02
[58] Field of Search................... 210/154, 159, 162

[56] References Cited
UNITED STATES PATENTS 1,801,111   4/1931   Schofield et al.................... 210/159
3,355,022   11/1967  Nordell............................. 210/162
3,482,698   12/1969  Ostnas............................. 210/159

*Primary Examiner*—John Adee

[57] ABSTRACT

A grate rake for cleaning a grate in upward into an emptying position water conduit, which grate extends transversely of the conduit and whose bars extend substantially vertically, the rake comprising a handle horizontally pivoted on a crank arm which is horizontally pivoted on a fixed member, a rake comb pivoted to said handle on a horizontal axis, and fluid pressure operated means for moving said comb from a position of rest above the water surface level into an initial working position at the lower end of said grate and from this position along a working travel with its teeth engaging through between the grate bars and collecting the accumulated oversize material on the grate, upward into and emptying position and back again. the grate, upward into an emptying position an d back again.

13 Claims, 5 Drawing Figures

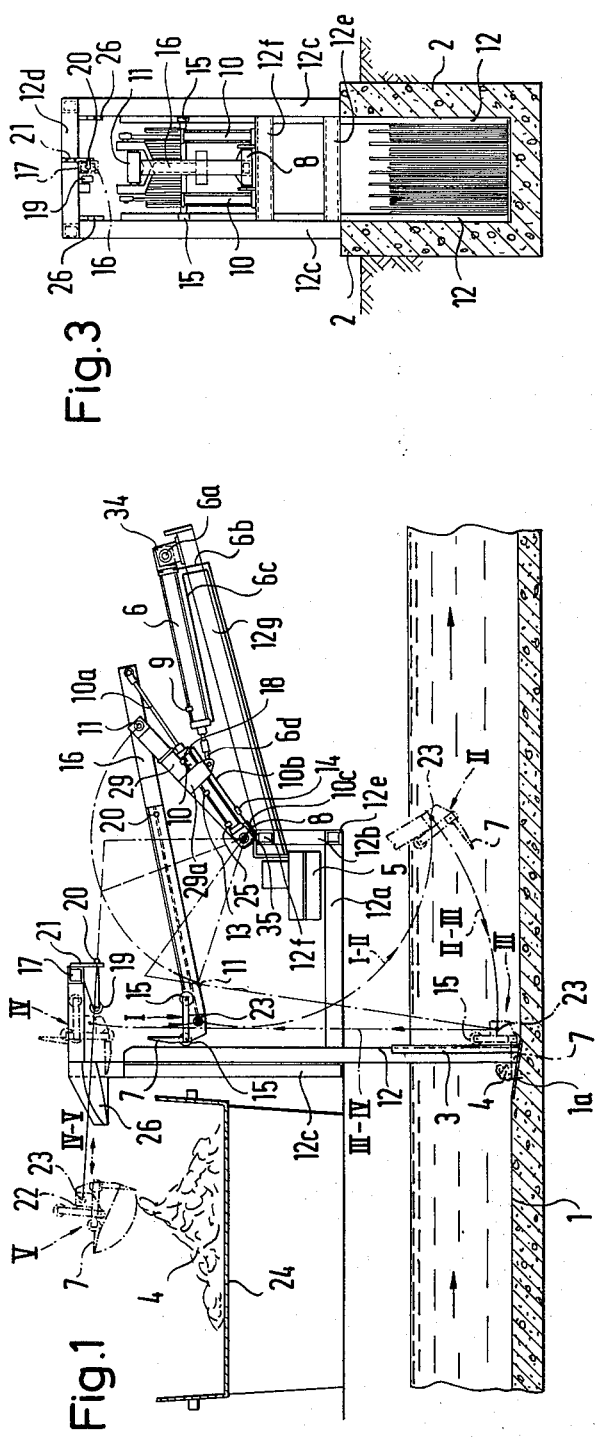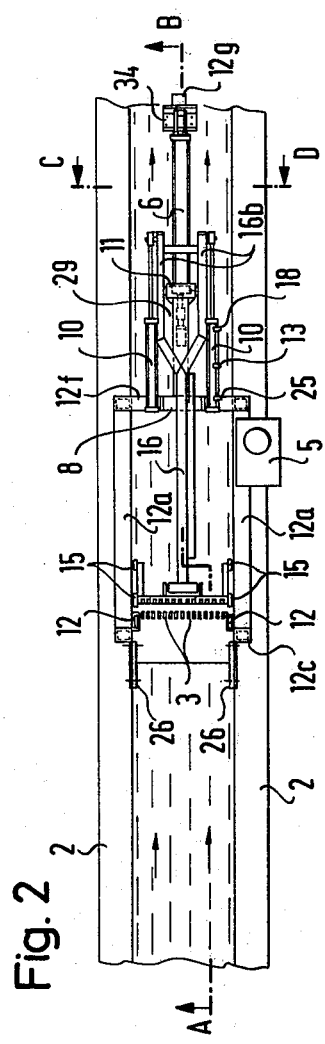

GRATE RAKE FOR CLEANING A GRATE ARRANGED IN A WATER CONDUIT

The invention relates to a grate rake for cleaning a grate or screen arranged in a water conduit, having a rake handle pivotable about a horizontal axis, and a grate comb arranged on the said handle, the said comb being adapted to be moved from a position of rest above the level of the water into an initial working position at the lower end of the grate and from this position along a working travel, with its teeth engaging through between the grate bars and collecting the accumulated rubbish or oversize material, upwards into an emptying position and back again.

In known grate rakes of this kind the rake handle is moved upwards in its longitudinal direction at the working movement of the rake comb, so that its upper end projects far upwards in the emptying position of the comb. This requires a relatively considerable overall height for the grate installation and thus requires a considerable space for a structure in which a grate installation is provided, for example a protecting gallery. Also, in the case of known grate rakes the comb carrying the oversize material when in its emptying position is in such a disadvantageous situation that the oversize material can be discharged only into a relatively small collecting container, owing to lack of space, or into a narrow and shallow dirt channel from which coarse substances have to be removed in an additional operation.

The invention has as its object to construct a grate rake of the type indicated in such a manner that more particularly including cases when it is used with a grate installation having straight, vertical or slightly inclined grate bars, at the upward movement of the rake comb and in the emptying position of the said comb the said rake does not project upwards and as a result, even when the space available is limited such as is the case for example in a protecting gallery, it is possible to use a relatively large collecting container for the oversize material discharged by the rake comb.

This object is achieved according to the invention in that in the position of rest of the rake comb the rake handle takes up an initial position inclined oppositely to the direction of flow of the water slightly in a downward and forward direction towards the grate bars, and to carry out the movements of the rake comb is connected at its end remote from the said comb by an articulation comprising a horizontal pivoting axis with one end of a crank arm whose other end is adapted to pivot about a horizontal axis at some spacing behind the grate in a stationary pivot bearing, and on which one end of a first double-acting cylinder and piston unit is pivotably attached which at its other end is connected to a likewise stationary pivot bearing to be pivotable about a horizontal pivoting axis and is adapted to be run in and out in the opposite direction relatively to a second double-acting cylinder and piston unit which is attached pivotably to the rear end of the rake handle at some distance from the articulation of the crank arm to the rake handle containing the pivoting axis, and there is associated with the rake comb at the grate bars a rake comb guide which extends parallel to the said bars and extends upwards approximately to the height of its emptying position.

With a grate rake constructed in this way, at the rear end of the rake handle between the pivotable point of attachment of the crank arm and the pivotable point of attachment of the second cylinder and piston unit there is formed a lever-like portion which in co-operation with the crank arm and the alternate operation of the oppositely operating cylinder and piston units permits pivoting movements and advancing movements of the rake handle effected for all movements of the rake comb from the position of rest to the emptying position in a vertical plane, wherein the said handle is moved only to a slight extent upwards above its height corresponding to the position of rest of the rake comb, and in all movements has no part higher than the rake comb in its emptying position. Even if the entire grate installation equipped with the grate rake is arranged in a protecting gallery or another structure for example for protection against the weather and winter cold, it is not necessary to have an overall height above the emptying position of the rake comb, and even with a limited overall height a sufficiently large collecting container can be provided for receiving the oversize material discharged by the grate rake.

In a first constructional form of the invention the grate rake can also be so constructed that the stationary pivot bearing of the first cylinder and piston unit is arranged in the direction of flow of the water with a spacing downstream of the stationary pivot bearing of the crank arm, and this unit acts on the crank arm approximately half-way along the length of the said arm, and that the articulation containing the pivoting axis of the rake handle is situated in the direction of flow upstream of the point of attachment of one end of the second cylinder and piston unit which at its other end is connected pivotably with the stationary pivot bearing of the crank arm.

In a particularly convenient constructional form of the invention, wherein the entire grate installation can be given not only a low overall height but also a reduced overall length in the longitudinal direction of the water conduit, however, the arrangement may also be such that the stationary pivot bearing of the first cylinder and piston unit is arranged in the direction of flow upstream of the stationary pivot bearing of the crank arm at only a small spacing downstream of the guide for the rake comb, and that the second cylinder and piston unit at one end is attached to the rake handle at some spacing before the articulation, containing the pivoting axis, of the crank arm and the rake handle, and at its other end is pivotably connected to the axis-containing articulation of the first cylinder and piston unit with the crank arm.

Figure 5:
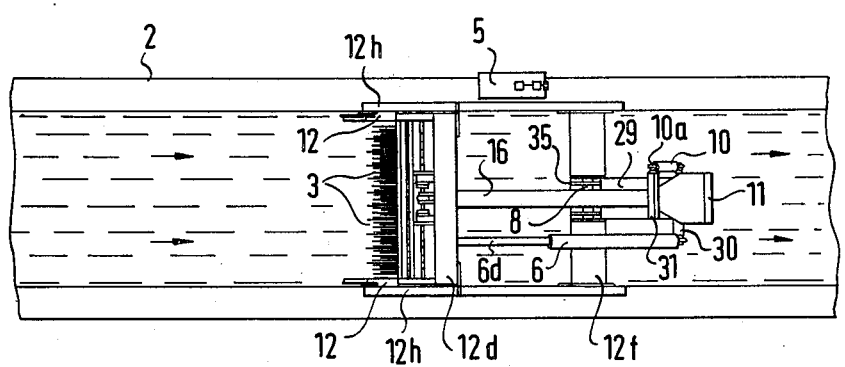

Further features of the invention will become clear from the following description of two constructional examples of the invention with the help of the drawings. In the drawings:

FIG. 1 shows a grate installation with a first constructional form of the grate rake according to the invention in longitudinal section taken on the line A–B of FIG. 2, FIG. 2 shows the grate installation according to FIG. 1 in plan view, FIG. 3 shows a cross-section through the grate installation on the line C–D of FIG. 2, FIG. 4 shows a grate installation corresponding substantially to FIGS. 1 to 3 with a second constructional form of the grate rake according to the invention, and FIG. 5 shows a plan view of FIG. 4.

Both constructional forms of grate rake are described hereinafter in conjunction with a substantially identical grate installation for a waste water conduit having a floor 1 and side walls 2, through which waste water mixed with material to be retained by the grate flows in the direction indicated by the direction arrows. The waste water passes through a grate which is provided with grate bars 3 arranged with small spacings adjacent one another, these bars being straight in both cases, but in FIGS. 1–3 they are arranged in a vertical direction and in FIG. 4 they are inclined slightly upstream relatively to the direction of flow of the waste water. In both cases the grate installation is provided, for removing the oversize material 4 collecting on the grate bars, with a grate rake which comprises a rake handle 16 pivotable in a vertical plane about a horizontal pivoting axis 11 and a rake comb 7 which is adapted to be swung on the said handle about a horizontal axis 23. The said comb takes up a position of rest above the water surface level when not in use, as is usual, this position being designated here as I, and from which the said comb is moved first of all through an intermediate position II into an initial working position III at the lowest region of the grate, at the downwardly sloping floor position 1a. From here, the working travel of the rake comb is in an upward direction, and it engages with its teeth between the grate bars, the teeth projecting through oppositely to the direction of flow of the water, and it is guided on a comb guide 12 comprising two lateral guide rails in its upward movement. In this, the rake comb carries with it the collected oversize material and, as soon as it has reached its emptying position V at the upper end of the grate installation, discharges the said material by a tilting movement about the axis 23 to a collecting container 24 situated below it.

According to the invention the rake handle 16 is so arranged in both constructional forms that in the position of rest I of the rake comb 7 it takes up an initial position inclined oppositely to the direction of flow of the water more or less slightly downwards and forwards towards the grate, this initial position being shown in full lines in the drawings. From this initial position the rake handle first of all carries out two successive pivoting movements in a vertical plane to move the rake comb 7 from the position of rest I on two arcuate paths I–II and II–III which are adjacent one another and are in the reverse direction to one another through the intermediate position II into the initial working position III before it is moved along its working travel and on the guide 12 upwards into an upper end position IV at the upper end of the frame bars 12c and from this position along an advancing path IV–V into an emptying position V.

To carry out these movements of the rake comb 7, in both constructional forms of the invention there are arranged a crank arm 29 connected with the rear end region of the rake handle 16 by an articulation or joint containing the pivoting axis 11, and a first cylinder and piston unit 6 attached to the said crank arm and a second cylinder and piston unit 10 which is attached to the rake handle in the region of the rear end of the rake handle 16 at some spacing from the articulation containing the pivoting axis 11. The portion of the rake handle 16 situated between the pivoting axis 11 and the point of action or articulation of the second cylinder and piston unit 10 forms a lever-like portion which facilitates the pivoting movements of the rake handle and can be situated in front of or behind the pivoting axis 11. The two cylinder and piston units 6 and 10, which can be operated hydraulically or pneumatically, are in each case of double-acting construction and are so operated, for carrying out the movements of the grate rake, alternately and in opposite directions to one another, that after an inward or outward movement of one unit the other unit carries out an outward or inward movement respectively.

In the constructional form shown in FIGS. 1–3 the lever-like portion of the rake handle 16 is arranged downstream of the pivoting axis 11 of the rake handle in the direction of flow. Arranged on the lateral guide rails of the rake comb guide 12 in each case is a horizontal supporting rail 12a extending in the direction of flow of the water, at each side wall 2 of the conduit above the water surface level. At the free ends of the said supporting rails 12a, they are connected by a transverse member 12e to form a horizontal frame, the transverse member 12e at the same time forming the lower cross-member of a vertical frame with the lateral frame uprights 12b and the upper cross-member or transverse member 12f. Also secured on the vertical guide rails are vertical uprights 12c which at the upper ends of the said uprights are connected by a cross-member 12d to one another. From the upper transverse member 12f there extends in the direction of flow of the water a cantilever member 12g which is inclined slightly upwards in a downstream direction, and on the free end of which a stationary pivot bearing 34 is formed with the horizontal pivoting axis 6a for the cylinder and piston unit 6. The piston (not shown) of the unit 6 can be acted upon selectively from both sides through pressure conduits 6b and 6c which start from a pressure medium source 5 and open into the cylinder. The pressure medium source 5 can be a hydraulic unit or a compressor.

Constructed on the upper transverse member 12f, centrally, is a stationary pivot bearing 35 for the crank arm 29 with the horizontal pivoting axis 8. The crank arm 29 is provided approximately centrally with a strap 29a to which there is attached one end of the cylinder and piston unit 6, this end being formed here by the piston rod 6d. When the rake comb takes up its position of rest I shown in full lines, this unit is in a retracted state.

The connecting articulation between the rake handle 16 and the other end of the crank arm 29 contains the horizontal pivoting axis 11 in the form of a transverse rod arranged between a forked end portion 16b of the rake handle, the point of articulation of the said transverse rod in this case being situated with some spacing from the free ends of the end portion 16b. In accordance with the forked construction of the end portion, the second cylinder and piston unit 10 comprises two lateral cylinders each with a piston rod 10a, these being pivotably connected directly in this case to the free ends of the end portion 16b. The pistons of the unit 10 are again adapted to be operated selectively from the pressure medium source 5 through pressure conduits 10b and 10c. The two cylinders of the cylinder and piston unit 10 are mounted to be pivotable about the horizontal pivoting axis 8 which is also used for supporting the crank arm 29, the said pivoting axis being arranged in the stationary pivot bearing 35 constructed on the upper transverse member 12f. In the position of rest I of the rake comb 7 the cylinder and piston unit 10 is in the extended state.

The rake comb 7 is adapted to pivot about the horizontal pivoting axis 23 from the position which it occupies in the condition of rest, through a total of 180° relatively to the rake handle 16. To release the downward pivoting movement there is used a controllable disengaging cam disc 22 which is associated with the articulation 23.

In this constructional form the rake comb 7 is first of all moved when the cylinder and piston unit 6 is operated by extension of its piston rod 6d from the position of rest I along the path I–II about the pivoting axis 8 into the intermediate position II. On reaching the intermediate position II by means of a magnetic field switch 9 which is mounted on the cylinder of the cylinder-piston unit 6, the cylinders of the cylinder-piston unit 10 are so constructed that the piston rods 10a of the said unit are retracted. As a result the handle 16 is pivoted in such a manner that the rake comb 7 is moved from the intermediate position II along the arcuate path II–III about the pivoting axis 11 into its initial working position III at the lower end of the rake comb guide. On reaching this position, by means of a magnetic field switch 13 arranged on one cylinder of the unit 10 the cylinder and piston unit 6 is so controlled that its piston rod 6d moves inwards. When this happens the rake comb guide 12, on which the rake comb 7 slides upwards, constrainedly causes the piston rods 10a of the second unit 10 to move outwards in opposition to the resistance of a pressure limiting valve 14. The oversize material 4 lying on the rake comb 7 is lifted upwards. Two guide dogs 15 hold the teeth of the rake comb 7 in a horizontal position during upward travel. The pressure limiting valve 14 which is arranged in the pressure medium conduit 10b is adjustable so that the pressure force with which the rake comb is applied against the rake comb guide 12 can be regulated. If an obstacle is in front of the grate bars 3 which the rake comb 7 cannot lift, the rake yields in the direction of flow of the water and, after moving round the obstacle, is again applied to the rake comb guide 12.

When the rake comb 7 reaches the position IV at the upper end of the rake comb guide 12, the rake handle 16 is applied against an upper slide rail 17 secured on the cross-member 12d. A magnetic field switch 18 on one cylinder of the unit 10 causes the cylinder of the unit 6 to move out, so that the rake handle 16 carries out an advancing movement on the advancing path IV–V in the direction opposite to the direction of flow, being guided during this time by a guide roller 19. The cylinders of the unit 10 are constrainedly retracted. When the rake comb 7 is moved forwards in this way into its emptying position V, a disengaging pin 20 arranged on the rake handle 16 abuts against an abutment 21 secured to the cross-member 12d. This brings about disengagement at the cam disc 22 so that the rake comb can rotate freely about the axis of rotation 23 and swings downwards. The oversize material 4 situated on the rake comb 7 then falls into the collecting container 24 situated below it.

In the emptying position V of the rake comb 7 the cylinder of the unit 6 is changed-over by a magnetic field switch 25 arranged on one cylinder of the unit 10 and retracts, whilst the piston rods 10a of the cylinders of the unit 10 are moved out. The rake handle 16 as a result is moved back again approximately horizontally, guided by the slide rail 17 and the guide roller 19. Shortly before the rake comb 7 reaches the position IV, the rake handle 16 is erected by a stationary erecting plate 26. After moving over the erecting plate 26 the rake handle 16 is so pivoted by the further retraction of the cylinders of the unit 10 that the rake comb 7 again takes up the position of rest I.

When using the switches 9, 13, 18 and 25 for controlling the cylinder and piston units 6 and 10, the pistons of these units are given a permanent magnet construction. When one of the pistons reaches one of the switches, which are arranged externally on the cylinders, a signal is transmitted and acts by way of electrical relays on control valves which are not shown here and on the pressure limiting valve 14, which control the retracting and extending of the units. But instead of the magnetic field switches it is also possible to use other control means having a similar action, for example limit switches.

In the constructional form shown in FIG. 4 and FIG. 5 the lever-like portion of the rake handle 16 is arranged upstream of the pivot bearing 11 of the rake handle in the direction of flow. The supporting rails 12a extending downstream in the direction of flow are again connected to one another at the rear ends of the said rails by the transverse member 12e.

The stationary pivot bearing 35 with the pivoting axis 8 for the crank arm 29, however, is in this case formed directly on the transverse member 12e. Furthermore, in the forward region of the supporting rails 12a two vertical frame uprights 12c are arranged with spacing from one another which are connected at each side at the upper ends of the said uprights by cross-members 12h extending in the direction of flow. Transversely to the direction of flow the rear ends of the cross-members 12h are connected to one another by the upper cross-member 12d which at the same time also connects to one another the rear frame uprights 12c at the two sides.

The stationary pivot bearing 34 with the pivoting axis 6a for the first cylinder piston unit 6 is also arranged on the upper cross member 12d. This stationary pivot bearing, therefore, in contrast to the constructional form shown in FIGS. 1–3 is situated in the direction of flow upstream of the stationary pivot bearing 35 of the crank arm 29 at a small distance behind the front frame uprights 12c. The cylinder and piston unit 6 in the position of rest I of the grate rake which is again shown in full lines in FIG. 4, in which the rake comb 7 is situated approximately at the level of the upper edge of the side walls 2 and the rake handle 16 is inclined rearwards and upwards, takes up a rearward and downwardly inclined position in the pushed-out state and in the illustrated constructional form is connected with the free end of its piston rod 6d by means of the pivoting axis 6a with the stationary pivot bearing 34, whereas the free end of its cylinder on the axis 30 is pivotably connected to the crank arm 29, or the strap 29a thereof. The articulation is situated approximately in the lower third of the crank arm 29. The crank arm 29 is connected with the rear end of the rake handle 16 by means of the pivoting axis 11 of the rake handle 16, which in this case is arranged directly on the free end of the said handle.

The second cylinder and piston unit 10 in the position of rest I of the grate rake takes up an almost vertical position in the retracted state and is attached with its upper end on the articulation 31 at a spacing in front of the pivoting axis 11 on the rake handle 16. The other end of the cylinder and piston unit 10 is connected pivotably with the articulation containing the axis 30 of the first cylinder and piston unit 6 with the crank arm 29, or its strap 29a.

In the constructional form shown in FIG. 4 and FIG. 5 the movements for the rake handle 16 and the rake comb 7 are similar to those in the constructional form shown in FIG. 1 and FIG. 2. But the movement of the rake comb 7 takes place on the arcuate path I–II when the piston rod 6d of the first cylinder piston unit 6 is retracted, and on the arcuate path II–III when the piston rod 10a of the second cylinder and piston unit is extended. Likewise, for moving the rake comb 7 upwards on its working path into the upper position IV and for the approximately horizontal advancing movement of the rake comb 7 into its emptying position V, and also for returning the rake comb into the position of rest I the double-acting cylinder and piston units 6 and 10 are retracted and extended oppositely to the constructional form shown in FIG. 1 and FIG. 2.

To operate the two cylinder and piston units, these are again connected by pressure medium conduits 6b and 6c and also 10b and 10c to the pressure medium source 5. A pressure switch 32 and an electrical programme unit 33 are arranged for control purposes in the region of the pressure medium source 5. The pressure switch 32 operates in such a manner that each time the rake comb 7 reaches one of the positions I, II, III, IV or V, the pressure in the hydraulic or pneumatic pressure system rises to a preset switching pressure of the pressure switch. As a result, an electrical switch is operated which itself operates the programme unit for controlling control valves (not shown) for supplying and discharging pressure medium for the various sides of each piston of the two cylinder and piston units 6 and 10.

We claim:

1. A grate rake for cleaning a grate arranged in a water conduit, including a rake handle, a rake comb, means pivotally connecting said comb to said handle, means for moving said comb from a position of rest above the water surface level into an initial working position at the lower end of said grate and from this position along a working travel with its teeth engaging through between the grate bars and collecting the accumulated oversize material on the grate, Upward into an emptying position and back again, said rake handle, in the position of rest of the said rake comb, occupying an initial position which is inclined oppositely to the direction of flow of the water slightly downward and forward toward the bars of the grate, and means to carry out the movements of the rake comb comprising a crank arm, means connecting one end of said crank arm to said handle at the end of the latter remote from said comb by an articulation containing a horizontal pivoting axis, stationary means pivoting the other end of said crank arm about a horizontal axis behind the grate, a first double-acting cylinder and piston unit pivoted at one end to said crank arm, a second stationary pivot means, means connecting the other end of said first cylinder and piston unit to said second stationary pivot means, a second double-acting cylinder and piston unit, means pivotably attaching said second cylinder and piston unit at the rear end of the rake handle at a point spaced from the articulation between the crank arm and the rake handle, and a rake comb guide arranged parallel to the said grate bars and extending upwardly approximately to the level of the rake comb emptying position.

2. Grate rake according to claim 1, the stationary pivot bearing of the first cylinder and piston unit being spaced downstream of the stationary pivot bearing of the crank arm, said first unit being attached to the said crank arm approximately half-way along its length, the articulation containing the pivoting axis of the rake handle being situated on the rake handle upstream of the point of action of one end of the second cylinder and piston unit the other end of which is pivotably connected with the stationary pivot bearing of the crank arm.

3. Grate rake according to claim 2, characterized in that in the position of rest of the rake comb the first cylinder and piston unit is in the retracted state and the second cylinder and piston unit is in its extended state.

4. Grate rake according to claim 2 including a transverse member spanning the water conduit above the side walls of the said conduit, the stationary pivot means for the crank arm being on the said member, and a cantilever arm which extends downstream in the direction of flow being also mounted on the said member the rear end of said cantilever arm carrying the stationary pivot bearing of the first cylinder and piston unit which bearing contains the pivoting axis.

5. Grate rake according to claim 2, the stationary pivot bearing of the first cylinder and piston unit being arranged in the direction of flow upstream of the stationary pivot bearing of the crank arm at only a small spacing behind the guide for the rake comb and the second cylinder and piston unit being attached to the rake handle at one end at a spacing in front of the articulation of the crank arm and the rake handle, and at its other end is connected pivotably with the articulation containing the axis of the first cylinder and piston unit with the crank arm.

6. Grate rake according to claim 5, characterized in that in the position of rest of the rake comb the first cylinder and piston unit is in its extended state and the second cylinder and piston unit is in its retracted state.

7. Grate rake according to claim 5, characterized in that the stationary pivot bearing of the crank arm is constructed on said transverse member spanning the water conduit and placed on the side walls of the said conduit, including a front cross-member disposed approximately at the level of the emptying position of the rake comb, the stationary pivot bearing of the first cylinder and piston unit being constructed on said front cross-member.

8. Grate rake according to claim 5, characterized in that the piston rod of the first cylinder and piston unit is pivotably connected to a stationary pivot bearing and the cylinder of said unit is pivotably connected to the crank arm.

9. Grate rake according to claim 5, characterized in that the articulation between the first cylinder and piston unit and the crank arm is disposed approximately in the lower third of the crank arm.

10. Grate rake according to claim 1, including means for controlling the two cylinder and piston units comprising a pressure switch and an electrical program unit.

11. Grate rake according to claim 1, including guide means for the rake handle, characterized in that the rake handle is approximately horizontal in the position corresponding to the upper position of the rake comb, and in this situation is advanced into the emptying position by operation of the first cylinder and piston unit, the rake handle being guided by said guide means.

12. Grate rake according to claim 11, the pivotal axis of the rake comb being horizontal, said conduit including a fixed abutment, a disengaging pin on the rake handle which is operated, on reaching the emptying position of the rake comb, by said fixed abutment, the said pin releasing the rake comb for a tilting movement about the axis for throwing the oversize material into a collecting container situated below the emptying position.

13. Grate rake according to claim 1, characterized in that the grate rake is so mounted and guided that the rake comb moves, before reaching the initial working position, at least 0.85 meters along a shallow-curved, approximately horizontal arcuate path of travel.

* * * * *